J. T. DUFF.
PULLEY OR WHEEL.
APPLICATION FILED JULY 11, 1905.

905,803.

Patented Dec. 1, 1908.

WITNESSES

INVENTOR

UNITED STATES PATENT OFFICE.

JOHN T. DUFF, OF PITTSBURG, PENNSYLVANIA.

PULLEY OR WHEEL.

No. 905,803.  Specification of Letters Patent.  Patented Dec. 1, 1908.

Application filed July 11, 1905. Serial No. 269,209.

*To all whom it may concern:*

Be it known that I, JOHN T. DUFF, of Pittsburg, Allegheny county, Pennsylvania, have invented a new and useful Pulley or Wheel, of which the following is a full, clear, and exact description, reference being had to the accompanying drawings, forming part of this specification, in which—

Figure 1:
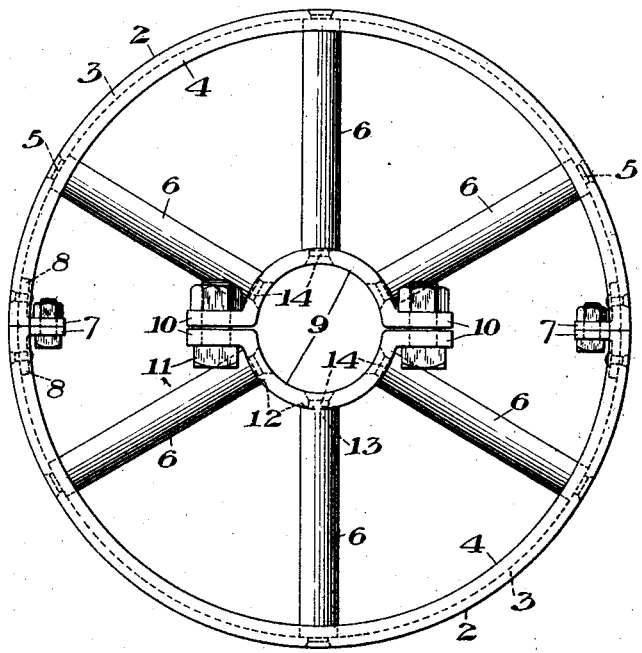
Figure 2:
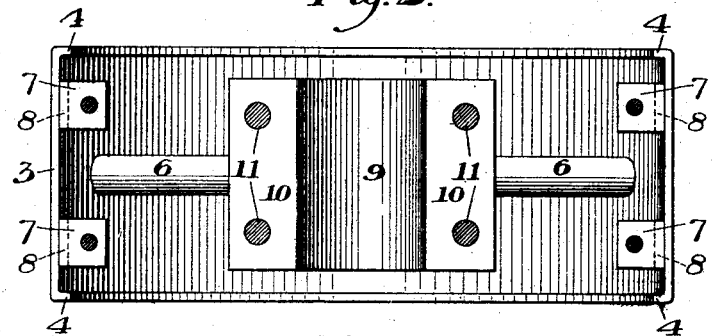
Figure 3:
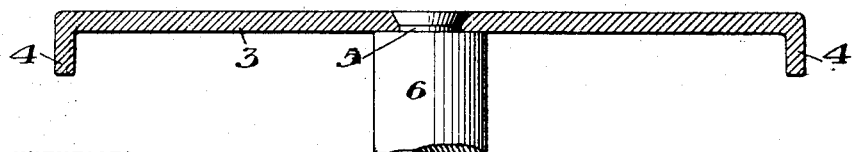

Figure 1 is a side elevation of my improved pulley or wheel; Fig. 2 is a central cross-section of the same; and Fig. 3 is a detail view.

My invention relates to the class of pulleys or wheels, and is designed to provide a simple, cheap and strong construction therefor.

In the drawings, I show the rim as composed of two semi-circular sections 2, 2, which are bent up from rolled channel shapes, having the web 3 and the flanges 4, 4 as shown in Fig. 2. These flanges project inwardly from the rim of the pulley and give a strong symmetrical section. The two rim sections have suitable countersunk holes to receive the reduced ends 5 of the spokes 6, these ends being riveted within the spoke-holes in the rim. The riveted ends lie within the countersunk portions, the heads of the rivets being flush with the outer periphery of the wheel or pulley.

The rim sections are secured together by pairs of clips or angle ears having the inner flanges 7, 7 bolted together, while their outer flanges 8 are riveted through suitable countersunk holes in the rim. The ends of the rim sections are ground or otherwise cut so as to bring their edges into radial planes, thus enabling them to fit accurately together when secured in place.

The hub is preferably made in two semi-tubular solid integral parts which may be formed preferably by die-shaping from flat blanks. I have shown each section as consisting of the curved part 9 having the flat end flanges 10, 10, the flanges or ears of the two parts being secured together by bolts 11. The curved parts of the hub sections are radially counterbored as shown at 12 to receive the square shoulders 13 at the inner ends of the spokes 6. The reduced straight inner end portions 14 of the spokes are riveted within the countersunk portions of the hub holes. The shoulders at the outer ends of the spokes may rest against the inner face of the rim.

The advantages of my invention result from the simplicity, cheapness and strength of the structure.

Variations may be made in the shape, size and arrangement of the parts without departing from my invention.

I claim:—

1. A sectional metal pulley comprising rim sections provided with spoke receiving holes countersunk on the outer faces, angle ears riveted on the inner faces at the ends of said rim sections, means for connecting together the angle ears of adjacent rim sections, hub sections formed of wrought metal having body portions semi-tubular in shape and provided with spoke receiving holes extending therethrough radially to the axis of the pulley and being countersunk on the inner face, said hub sections having at their edges radially projecting portions provided with bolt receiving holes, and spokes having straight end portions provided with square shoulders and tenons, said shoulders bearing against the inner face of the rim and outer face of the hub sections and the tenons being inserted in the spoke holes of the rim and hub and upset therein.

2. A sectional metal pulley comprising rim sections provided with spoke receiving holes countersunk on the outer face, hub sections, each being an integral solid member provided with spoke holes extending therethrough radially to the axis of the pulley and having flat seats surrounding said holes and radially projecting ears, bolts connecting said radially projecting ears, spokes having straight end portions provided with square shoulders and tenons, the shoulders bearing against the inner face of the rim, and against the seats of the hub and the tenons extending through the holes in the rim and hub and being upset therein.

In testimony whereof, I have hereunto set my hand.

JOHN T. DUFF.

Witnesses:
 JOHN MILLER,
 H. M. CORWIN.